UNITED STATES PATENT OFFICE.

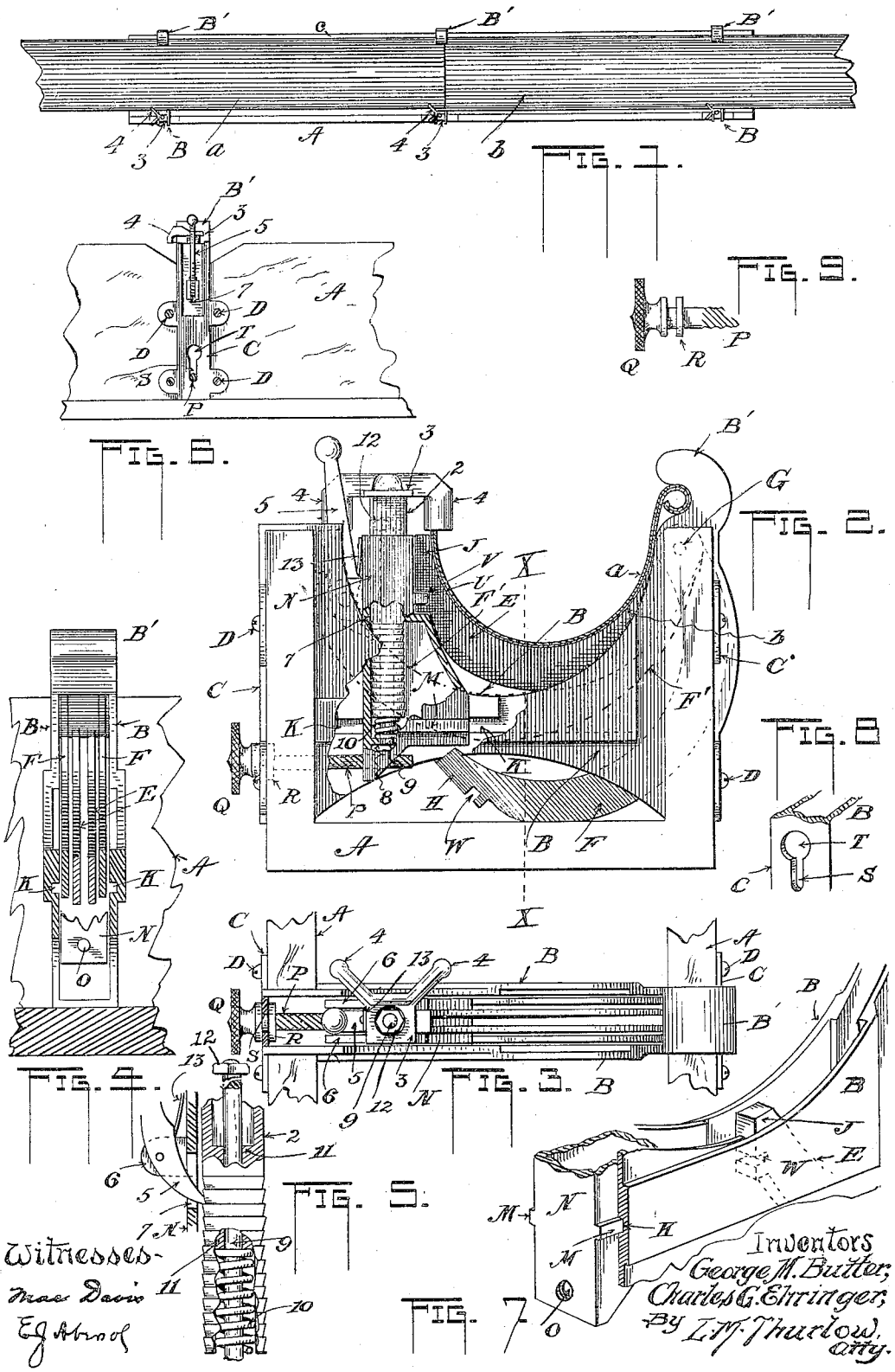

GEORGE M. BUTLER AND CHARLES G. EHRINGER, OF WASHBURN, ILLINOIS.

EAVES-TROUGH CLAMP.

No. 812,404.  Specification of Letters Patent.  Patented Feb. 13, 1906.

Application filed March 22, 1905. Serial No. 251,370.

*To all whom it may concern:*

Be it known that we, GEORGE M. BUTLER and CHARLES G. EHRINGER, citizens of the United States, residing at Washburn, in the county of Woodford and State of Illinois, have invented certain new and useful Improvements in Eaves-Trough Clamps; and we do hereby declare that the following is a full, clear, and exact description of the invention, which will enable others skilled in the art to which it appertains to make and use the same.

This invention pertains to a clamping-tool for use in soldering guttering.

The object of the invention is to provide a tool by which two lengths of "tin" guttering may be clamped together and sustained in perfect line during the operation of soldering the joint where the ends lap. In performing this work it is usual to prop the lengths of guttering, making them as near level as possible in so doing; but as this is an indifferent method it is almost impossible to have the lengths level enough so that when soldered and finished there will not be a "sag" at the soldered joint where water will rest; and it is the purpose, therefore, of our invention to provide a quick means of properly performing the initial work of leveling.

In the appended drawings, forming part of our application, Figure 1 is a top view of two pieces of guttering inclosed in a trough and held by three clamping members. Fig. 2 is an end elevation of a trough, showing our clamping device situated therein, showing the position of guttering therein. Fig. 3 is a top view of the clamp. Fig. 4 is an edge view of the clamp in section as viewed on line X X, Fig. 2. Fig. 5 is a detail view of a vertically-adjustable clamping member shown in part section. Fig. 6 is a side elevation of a portion of the trough and the clamping device much reduced in size. Fig. 7 is a perspective view of a guide and adjustable member in part section. Fig. 8 is a perspective view of a seating-slot for an adjusting-screw. Fig. 9 is a side view of a portion of the adjusting-screw.

A indicates a trough, preferably of wood, of several feet in length, near each end of which is one of our clamping devices, there being also one at the middle, as shown in Fig. 1. At the positions where the clamping devices are placed the sides of the trough A are slotted vertically and a frame consisting of two parallel plates B B, connected at the front and rear by plates C C, is let down into each slot and secured by screws D in said portions C C, as shown. The said plates B are cut out to leave a semicircular groove at the top to admit the guttering of any size to be handled. The bottoms of said plates are also cut out or arched to lighten the device, as well as cheapen it, by dispensing with material. At the back of the trough between the plates B described are pivoted two members E and F, the pivot being shown at G. Said members are made in the arc of circles of different size, the member E being smaller than the member F. The latter consists of two arms, as shown in Fig. 4, which terminate in a solid head H, and the member E is constructed in the same way and terminates in the head J, Fig. 7. Both members are hung on the same pivot and one is adapted to pass through the other, as Fig. 4 will make clear, so that either one may be employed without interference from the other. Each of the plates B is provided with a groove K parallel with each other and running horizontally for receiving the horizontal ribs M of a shiftable member N. The latter is provided with a hole O, threaded to receive a thread-bar P, which is provided with a knurled head Q and a collar R, leaving a groove between them to lie within a vertical slot S in the front portion C of the plates B. The said thread-bar is inserted through the enlargement T of the said slot S and seated in said slot, as shown in the figures, and particularly in Fig. 3. The thread of the bar is a "quick" one, so that the member N may be quickly adjusted as needed. Near the top of the member last mentioned is a lug U for entering a notch V in the free extremity of the curved member E, as shown in Fig. 2, and also adapted to enter the similar notch W in the member F when in a position corresponding to that of E in said Fig. 2. It will now be seen that the member E will be held in the position shown and perfectly rigid. The adjustable member N is hollow and has a vertical plunger 2 therein, as shown, the upper end carrying a head 3, provided with two projections 4. The lower portion of the plunger is provided with a series of ratchet-teeth on its four surfaces, said plunger being preferably square, the teeth extending upward to engage a latch 5, pivoted between the ears 6 of the member N, the latter being slotted at 7 to permit the latch to extend therethrough to meet said plunger. Within the latter is a vertical pin 9, whose lower end is secured in a horizontal portion 8 of the member N, Fig. 2. An opening-spring 10 is located between the portion 8 and the solid portion 11 of plunger 2, the tendency of which is to keep the latter raised. The upper end of the pin 9 carries a nut 12, Figs. 2, 3, and 5, which limits the upward movement of plunger 2 by meeting the said portion 11 of said plunger. The latch 5 described serves to hold the plunger at any height by being normally in engagement with the teeth thereof, this being acquired by a spring 13, secured to N, and having pressure above the pivot of the latch necessarily holds the extremity below the pivot in engagement with the teeth.

In operation the two lengths of guttering $a$ $b$ are placed within the trough, Fig. 1, the lapped ends of which rest upon the central clamping device. The "bead" $c$ of the guttering is inserted beneath an overhanging portion B' of the plates B, as shown in Fig. 2. The opposite edges of the guttering project above the free ends of the members E and one of the projections 4 is brought down upon said edges by pressure of the hand, thereby forcing the metal to conform perfectly to the curve of the receiving member E, the latch 5 engaging the tooth of the ratchet nearest it and there holding the plunger in a fixed position until released by moving said latch on its pivot to disengage it. The spring 10 then raises the plunger to release the guttering after its joints have been soldered. The device shown in the drawings will accommodate any sizes of the guttering—that is, by using either the member E or member F, the latter shown positioned for use at F' in dotted lines, Fig. 2. When the ends of the two lengths of guttering are firmly clamped beneath three of the clamping devices described, it is evident that they must be brought into perfect line relatively, so that a lower portion will not exist at the soldered point, which, as before intimated, is the object to be attained.

We claim—

1. In an eaves-trough clamp, devices for receiving and holding one edge of an eaves-trough, a plurality of members of varying size below the same for receiving troughs of different sizes each of said members being employed only for the size of trough corresponding thereto and a clamping member for descending upon the opposite edge of the trough and holding it in place within the member designed for it.

2. In an eaves-trough clamp, devices for receiving and holding one edge of an eaves-trough, a member for receiving and supporting the trough for the purposes described, and a clamp at the opposite edge of the trough for holding the said trough, said member adapted to pass out of the way to be replaced by another member of a different size for the purposes described.

3. In an eaves-trough clamp, devices for receiving and holding in place one edge of an eaves-trough, a removable U-shaped member for receiving said trough, a clamp for crowding down and holding the trough in the said member, and means for supporting the member in its proper position.

4. In an eaves-trough clamp, devices for receiving and holding in place one edge of an eaves-trough, a removable member for receiving the trough and in which said trough fits, a clamp for holding the trough in place within the member, means for supporting the member in position, the means adapted to release the said members and engage others of different size.

5. In an eaves-trough clamp, a support, devices mounted thereon to receive and hold an edge of the trough, a member pivoted at one extremity on the support and adapted for the reception of the trough, a clamp for descending upon the opposite edge of the trough for forcing it into and holding it within the member, supporting means for sustaining the member at its free end but adapted to release the member, and a similar member of different size adapted for separate engagement with the supporting means for the purposes described.

6. In an eaves-trough clamp, a support, overhanging hooked devices for receiving one edge of the trough, a U-shaped member pivoted at one end to the support below the devices described, its other end adapted to be raised for receiving the trough, horizontally-adjusted means for supporting it in position for use, a clamp for descending upon the free edge of the trough for holding it within the member, and a second pivoted member of different size adapted for engagement with the horizontally-adjustable means for receiving a trough of different size, the clamp adapted also to sustain the different-sized troughs in place.

7. In an eaves-trough clamp, a support, hooked devices secured thereto for receiving one edge of the trough, a vertically-movable member for holding the trough, means for holding that member in rigid position for use, a vertically-movable clamp for bearing upon the opposite edge of the trough and means for releasing the clamp to permit it to rise to release the trough.

8. In an eaves-trough clamp, a support, devices for receiving and holding one edge of the trough, a plurality of trough-supporting members of different sizes, adjustable means for separately holding any one of the members in a raised position for use, an adjustable clamp for engaging the free edge of the trough, and means in connection with said clamp for holding it in engagement with the said trough.

9. In an eaves-trough clamp, a support, devices for receiving and holding one edge of the trough, a plurality of trough-supporting members of different sizes, adjustable means for separately holding any one of the members in raised position for use, an adjustable clamp for engaging the free edge of the trough, and means in connection with said clamp for holding it in engagement with the said trough, the latter means adapted to release said clamp to free the trough.

10. In an eaves-trough clamp, a support, means for holding one edge of the trough, a plurality of adjustable members of different sizes for separately holding the trough and an adjustable device for engaging any one of the said adjustable members for holding it in a fixed position and adapted for releasing the same, and a clamp carried on and moving with the said device for clamping the separate different-sized troughs.

11. In an eaves-trough clamp, a support, devices for holding one side of the trough, a clamp for holding the opposite side, a plurality of members of a different size each for supporting troughs corresponding in size and form thereto each being vertically adjustable to bring it to a height that will meet the bottom and fit the trough and support it for the purposes explained.

In testimony whereof we affix our signatures in presence of two witnesses.

GEO. M. BUTLER.
CHAS. G. EHRINGER.

Witnesses:
WILLIAM JURY,
JOHN A. WHITE.